Aug. 15, 1961 W. P. FRANKENSTEIN 2,996,175

CARTON

Filed Nov. 1, 1954 9 Sheets-Sheet 1

INVENTOR.
WILLIAM P. FRANKENSTEIN
BY
Joseph A. Rave
Attorney

INVENTOR.
WILLIAM P. FRANKENSTEIN
BY
Joseph A. Rave
Attorney

Aug. 15, 1961 W. P. FRANKENSTEIN 2,996,175

CARTON

Filed Nov. 1, 1954 9 Sheets-Sheet 3

INVENTOR.
WILLIAM P. FRANKENSTEIN
BY
Joseph A. Rave
Attorney

Aug. 15, 1961 W. P. FRANKENSTEIN 2,996,175

CARTON

Filed Nov. 1, 1954 9 Sheets-Sheet 4

INVENTOR.
WILLIAM P. FRANKENSTEIN
BY
Joseph A. Rave
Attorney

INVENTOR.
WILLIAM P. FRANKENSTEIN
BY
Joseph A. Rave
Attorney

INVENTOR.
WILLIAM P. FRANKENSTEIN
BY
Joseph A. Rave
Attorney

CARTON

Filed Nov. 1, 1954 9 Sheets-Sheet 7

INVENTOR.
WILLIAM P FRANKENSTEIN
BY
Joseph A Rave
Attorney

INVENTOR.
WILLIAM P. FRANKENSTEIN
BY
Joseph A. Rave
Attorney

CARTON

Filed Nov. 1, 1954 9 Sheets-Sheet 9

INVENTOR.
WILLIAM P. FRANKENSTEIN
BY
Joseph A. Rave
Attorney

United States Patent Office
2,996,175
Patented Aug. 15, 1961

2,996,175
CARTON

William P. Frankenstein, 7260 Eastlawn Drive, Cincinnati, Ohio

Filed Nov. 1, 1954, Ser. No. 466,110
1 Claim. (Cl. 206—45)

This invention relates to improvements in a box or carton and particularly to improvements in a card or paperboard carton of a knock-down construction.

It is frequently desirable to supply a shipping and display carton for an article, a group of articles, or the like for enhancing the attractiveness of the package as well as providing the goods with pleasing and attractive surroundings.

This embellishment may take the form of contoured walls for the package as well as means inherent in the package whereby the goods after being shipped, may be attractively displayed by raising the goods relative to the package and supporting same in their raised or elevated position.

The carton or box of the present invention accomplishes the desirable features of a shipping container, box, or the like, and at the same time makes for an attractive gift package.

It is, therefore, the principal object of the present invention to provide a knocked-down box or carton which may be set up to have one or more of its walls contoured in transverse cross section, that is, have the walls, or members of the walls, at an angle to one another than normal or parallel with the base or bottom of the carton.

Another object of this invention is the provision of a box or carton that will accomplish the foregoing object and which at the same time, embodies means whereby the article or articles therein may be elevated with respect to the carton for visibility and sales appeal.

A further object of this invention is the provision of a box or carton acting as container for goods and in which the box or carton is provided with walls angularly related to one another and/or walls in which the wall elements, that is, the inner, outer, and top wall members thereof are angularly related to one another and to the remaining walls of the carton.

A still further object of the present invention is the provision of a box or carton acting as a container for the carton and package for accomplishing the foregoing goods for accomplishing the foregoing objects and with which use is made of a lid or cover to cooperate with the container to provide a closed package whose exterior dimensions are regular and symmetrical so that the said closed package may be suitably stacked and packed, in multiple, within a shipping container.

A still further object of the present invention is the provision of a blank or blanks from which the box or carton and package for accomplishing the foregoing objects is formed or set up and which blanks are of simple construction and readily erectable from a knock-down condition.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claim, without departing from or exceeding the spirit of the invention.

In the drawings.

Throughout the several views of the drawings, similar reference characters are employed to denote the same or similar parts.

Figure 1:
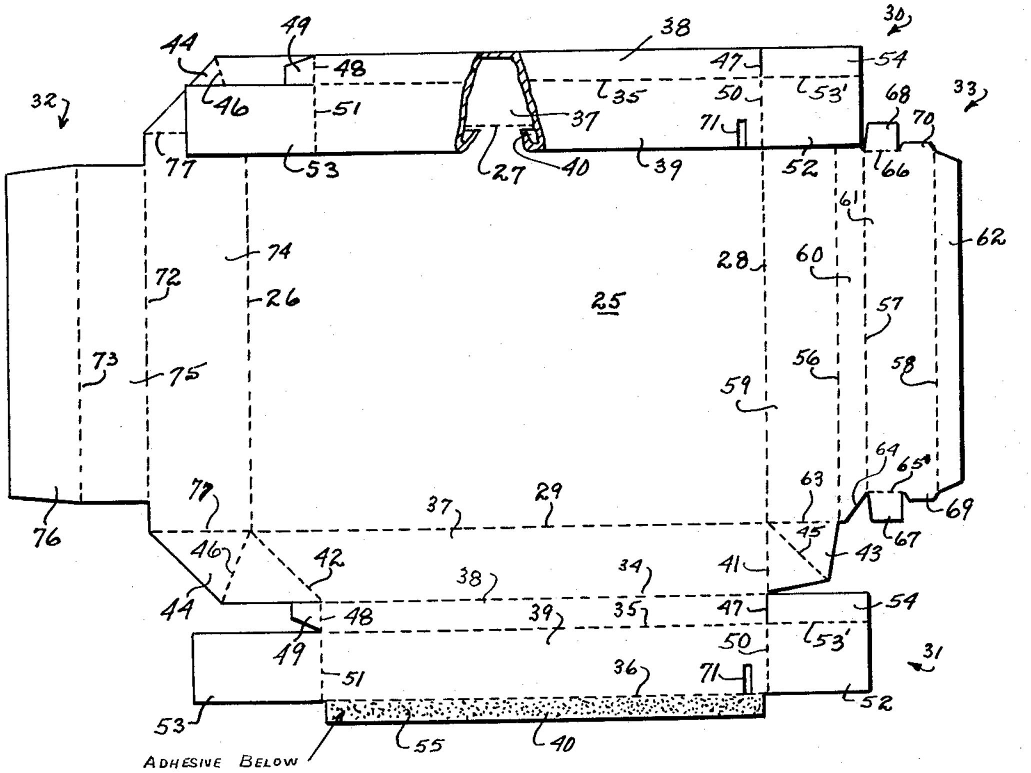
FIG. 1 is an extended plan view of a blank from which one form of a carton may be erected for accomplishing the objects of this invention.

As is evident from the foregoing, there is disclosed in this application several modifications of cartons or boxes together with a cover, all of which involve the basic principles of the invention and which modifications will be described in succession insofar as they are modifications over the basic blank, box, or carton.

Referring first to FIGS. 1 through 5, the carton blank there disclosed comprises a main or bottom panel 25 having its edges defined by score or fold lines 26, 27, 28 and 29. The score or fold lines 27 and 29 may be designated as the sides of the box or carton and respectively, hingedly, connect with the bottom panel extensions 30 and 31 which provide the side walls for the carton. The score or fold lines 26 and 28 may be designated as the ends and respectively integrally, hingedly, connect with the main or bottom panel 25 extensions 32 and 33 which in the erected carton form the end walls or, respectively, a front and a back wall depending upon the use to which the carton is put.

The side wall extensions 30 and 31 are substantially duplicates of one another and it is deemed sufficient that but one of them be described in detail for the other. Accordingly extension 31 is provided longitudinally thereof with a plurality of score or fold lines 34, 35 and 36 thereby forming in said extension parallel panels 37, 38, 39 and 40. The panel 37, in the erected carton forms the side wall outer wall member and has its one end defined by a score or fold line 41 that is aligned with the bottom panel end score or fold line 28. The panel 37 has its other end defined by a score or fold line 42 which is inwardly, anguarly, disposed with respect to the bottom panel end score or fold line 26. The said panel 37 through its ends score or fold lines 41 and 42 has integrally hingedly connected therewith corner flaps, respectively, 43 and 44 which are in effect bellows corners and are therefore, respectively, provided with a diagonal score or fold line 45 and 46 whereby the said corner pieces 43 and 44 may be folded on themselves, bellows-wise.

The panel 38 in the erected carton constitutes a side wall top wall members and has its one end defined by a cut line 47 in alignment with the panel 37 end score or fold line 41 while said panel 38 has its other end defined by a score or fold line 48 which extends parallel with the cut line 47 and from the inner end of the score or fold line 42 of the outer wall member or panel 37. The top wall member or panel 38 has integrally, hingedly, connected with its one, or lower, end through the score or fold line 48, a tucking flap 49.

The panel 39, in the erected carton, constitutes or forms the side wall inner wall member and has its ends defined by score or fold lines 50 and 51, respectively, in alignment with the ends of the top wall member or panel 38. The said inner wall member or panel 39 has through its ends fold or score lines 50 and 51 integrally, hingedly, connected therewith tucking flaps 52 and 53 with said tucking flap 52 having integrally hingedly connected therewith through a score or fold line 53, a spacer flap 54. The remaining side wall extension panel 40 constitutes a glue flap and carries suitable adhesive 55 applied to the undersurface thereof as viewed in FIG. 1.

The end wall or top wall extension 33, similar to each of the side wall extensions, is provided with a plurality of parallel score or fold lines 56, 57 and 58 thereby providing in said extension parallel panels 59, 60, 61 and 62. In the erected carton, the panel 59 constitutes the end or top wall outer wall member and has its ends, respectively, defined by a similar score or fold line 63 which are, respectively, in line with the bottom panel side score or fold lines 27 and 29 and which score or fold lines 63 integrally hingedly connected with the ends of the panel 59 the bellows corner pieces 43 at the adjacent ends of the side walls outer wall members or panels 37.

In the erected carton, the panel 60 forms or constitutes the end or top wall member and has its ends similarly contoured as illustrated for the lower end at 64. By this construction, the score or fold line 57 is of less length than the width of the carton between its side score or fold lines 27 and 28.

The panel 61 forms or constitutes the end or top wall inner wall member and has its ends, in the main, defined by score or fold lines 65 and 66 and which define the maximum or effective width of the said panel 61 and which panel 61 is of a length to fit between the side walls inner wall members upon erection of the carton. The panel 61 has integrally hingedly connected to its opposite ends, respectively, through the score or fold lines 65 and 66, tucking flaps 67 and 68 which also serve as spacers for the end or top wall inner and outer wall members as will presently be made clear. The said panel 61 has at its outer corners locking lugs 69 and 70, respectively, cooperating with a slit or slot 71 respectively formed in the side walls inner wall members or panels 39, inwardly of its end score or fold line 50 for locking the carton in its erected position.

The remaining panel 62 of the end or top wall extension 33 is a spacer panel for spacing the bottom end of the inner wall member or panel 61 from the outer wall member or panel 59.

The end wall or bottom wall extension 32 is provided with a pair of score or fold lines 72 and 73 thereby providing in the said extension 32 parallel panels 74, 75 and 76. In the erected carton the panel 74 forms or constitutes the end or bottom wall outer wall member and has each of its ends defined by a similar score or fold line 77, respectively in alignment with the bottom panel side score or fold lines 27 and 29. Said score or fold lines 75 integrally hingedly connected with the ends of the panel 74 the bellows corner pieces 44 at the lower ends of the side walls outer wall members or panels 37.

The panels 75 and 76 of the end or bottom wall are of a length substantially equal to the distance between the side walls inner wall members 39 upon erection thereof and respectively form or constitute the end or bottom wall inner wall member and spacing flap for the lower edge of said inner wall member.

The blank, after being cut or died, as above described and illustrated in FIG. 1, has, as noted above, the adhesive 55 applied to its side wall extensions glue flaps 40 whereupon the said glue flaps 40 are folded on the score or fold lines 36 of each extension for exposing the said adhesive 55. The said extensions 30 and 31 each are then folded, respectively, on its score or fold line 34 for superimposing the panels 38, 39 and 40 on the panel 37 and the main or bottom panel 25 as illustrated for the upper side wall extension, or extension 30, in FIG. 1, and thereby bringing the adhesive 55 into engagement with the carton bottom panel 25 through a zone inwardly of the main or bottom panel side edges score or fold lines 27 and 29. The blank is now in the knocked-down or folded condition of FIG. 2 and it is in this condition that the carton is shipped to the user.

The user, upon desiring to set up the carton, does so by raising the knocked-down side wall extension to be normal to the bottom panel 25. The mere raising of said knocked-down side wall extensions disposes the inner and outer wall members or panels 37 and 39 parallel with one another and in spaced relation as effected by the top wall members 38 and glue flaps 40.

The end or top wall is now erected by raising the extension 33 to dispose the same normal to the bottom panel 25 and which operation automatically folds the bellows corners 43, respectively, on themselves for disposition transversely of the said carton bottom panel. The end or top wall extension remaining panels 60, 61 and 62 are now folded to be normal to one another after having disposed the spacer flaps 67 and 68 normal to the ends of the inner wall member or panel 61. Upon the final positioning of the end or top wall panels to have the inner and outer wall members thereof parallel with one another and the top wall member and spacer flap, 60 and 62, parallel with one another, the locking lugs 69 and 70 are disposed in the side walls inner wall members locking slits or slots 71.

Figure 3:
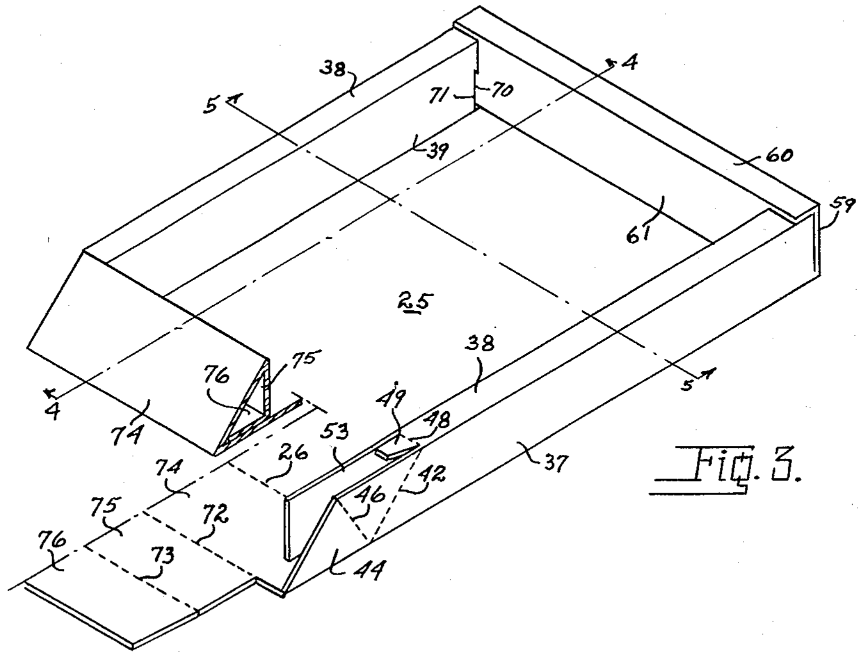
FIG. 3 is a perspective view of a carton set up from the knocked-down blank of FIGS. 1 and 2, with certain parts of the blank being torn away to more clearly illustrate construction of the carton.

The remaining end or bottom wall is now erected by folding the panels thereof to the angular positions illustrated in section in FIG. 3 and which causes the said end or bottom wall outer wall member to rest on the inwardly inclining ends of the side walls outer wall members as defined and provided by the score or fold lines 42 in said side walls inner wall members or panels 37.

It will be understood, that, similar to the erection of the end or top wall, the raising of the end or bottom wall extension 32 about the score or fold line 26 automatically folded the bellows corner pieces 34 on themselves on their diagonal score or fold line 46 to be transversely of the box or carton and underlie the end or bottom wall inwardly inclining outer wall member 74. The side walls inner wall members tucking flaps 53 are disposed transversely of the bottom panel 25 and are normal to said bottom panel 25 for backing up the end or bottom wall inner wall member. The flap 76 of said end or bottom wall extension 32 is disposed on the main or bottom panel 25 to extend from the lower end of the end of bottom wall inner wall member toward its outer wall member and be beneath the tucking flaps 53.

The carton is now in its fully erected position to have the goods placed therein.

The modification disclosed in FIGS. 6–11, inclusive, is, in the main, quite similar to that above described except that it not only has the end wall or bottom wall with an outwardly downwardly inclimbing outer wall member but also has side walls tapering from the end or top wall member to the bottom wall member. In addition, the modification in said FIGS. 6–11 includes means whereby the article or other goods within the erected carton may be elevated from the main or bottom panel thereof to a position upwardly of the end or top wall.

Figure 6:
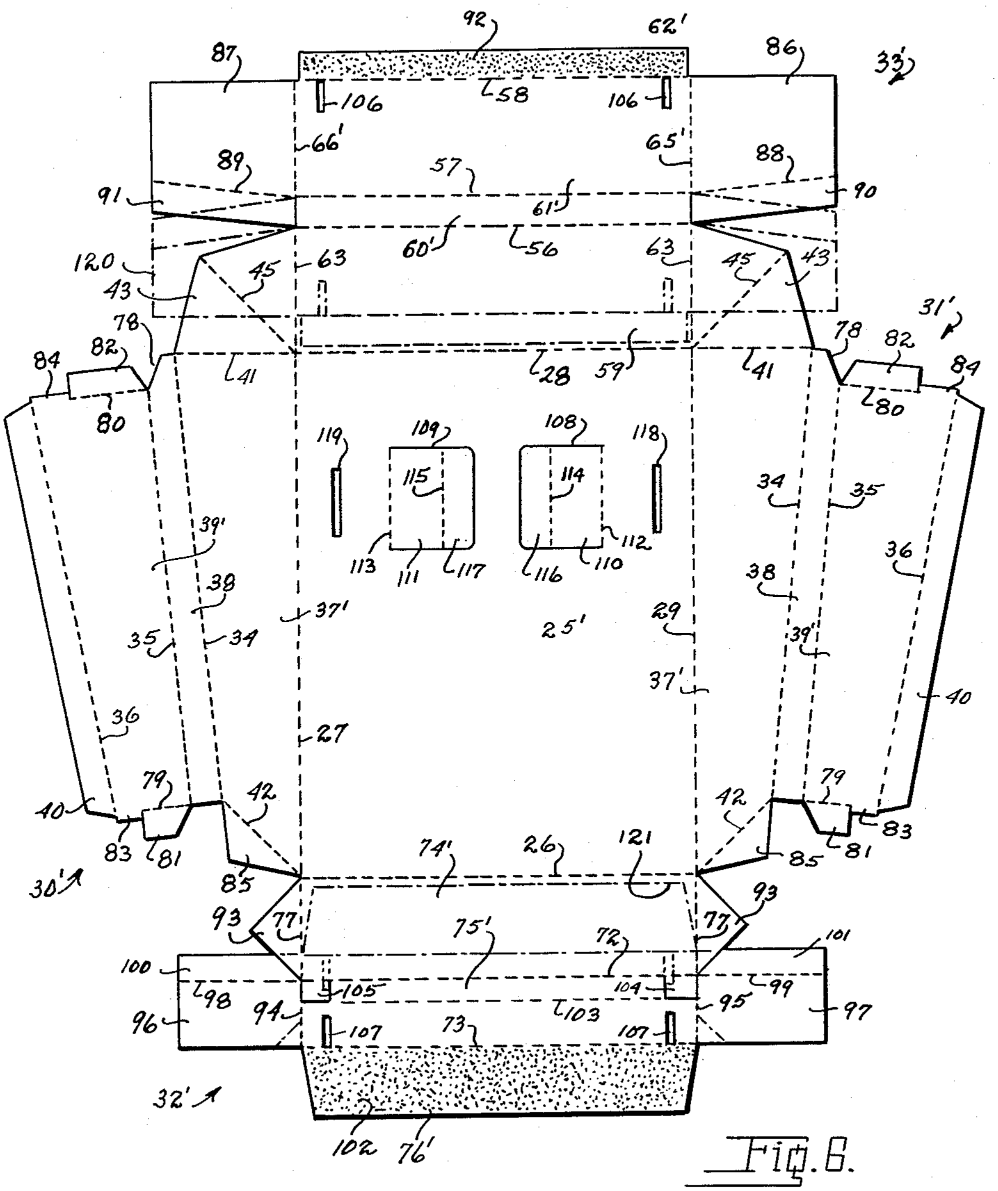
FIG. 6 is an extended plan view of a modified blank for providing a modified carton.

Specifically, the blank as illustrated in FIG. 6 comprises a main or bottom panel 25′ bounded by the ends and sides score or fold lines 26, 27, 28 and 29 for respectively integrally hingedly connecting with the said bottom panel 25′ side and end walls extensions 30′, 31′, 32′, and 33′.

Since, similar to the blank of FIG. 1, the side walls extensions 30′ and 31′ are substantially duplicates of one another, it is deemed sufficient if but one of them be described in detail. The side wall extension 30′ is substantially identical with the side wall 30 of FIG. 1 except that the side wall outer wall member or panel 37′ and the side wall inner wall member or panel 39′ are somewhat wedge shaped instead of being of equal height throughout their length as in the blank of FIG. 1. The side wall top wall member or panel 38 is of equal width throughout its length as is the panel 40 with said panels, however, having their axes extending outwardly and angled to the axes of the box or carton main panel 25′ instead of having said axes parallel with one another and with said main panel axis as disclosed in FIG. 1.

The panels 37′, 38, 39′ and 40 are separated from one another in the same manner as the corresponding panels of FIG. 1, namely, respectively, by score or fold lines 34, 35, and 36.

The panel 37′ has its upper and lower ends respectively defined by score or fold lines 41 and 42, the former being in line with the main or bottom panel top edge score or fold line 28 while the score or fold line 42 is at an angle to said main or main bottom panel bottom edge score or fold line 26.

The score or fold line 34, defining the upper edge of the side wall outer wall member 37′, inclines toward the score or fold line 27 thereby providing said side wall outer wall member or panel 37′ with an upper end of greater height than its lower end.

The side wall top wall member or panel 38 has its lower end defined by a cut line normal to its edges defining score or fold lines 34 and 35 and has its other end contoured as at 78.

The panel 39′, constituting in the erected carton, the side wall inner wall member, similar to the panel 37′ has its edge defining score or fold line 36 inclining toward the score or fold line 35 thereby providing said panel with a greater height at its upper end than it has at its lower end. In other words, the inner wall member, upon erection, has an area and outline similar to the area and outline of the outer wall member and these wall members are parallel with one another upon erection. The said panel 39′ has its ends defined, in the main, by score or fold lines 79 and 80 which, respectively, integrally hingedly connect with the said panel 39′ tucking flaps 81 and 82. The said panel 39′ outwardly of the tucking flaps 81 and 82, and at the corners thereof, are provided with locking lugs 83 and 84.

The remaining panel 40 of the side wall extension is a spacing flap and has its edge defining score line 36 and outer edge parallel, similar to the top wall member or panel 38 and is adapted to space the lower ends of the side wall inner and outer wall members 39′ and 37′ from one another.

The panel 37′ through its end score or fold line 41 has integrally hingedly connected therewith the corner piece 43 for folding bellows-wise and positioning transversely of the bottom panel 25′. The panel 37′ through its inclined score or fold line 42 has integrally hingedly connected therewith a tucking flap 85 which is merely a portion of the bellows corner flap 44 and is adapted to be inwardly disposed with respect to the said panel 37′ upon erection of the carton.

The top wall extension 33′ is substantially identical with the top wall extension 33 of FIG. 1 except that it has panel 60′, forming in the top wall the top wall member, of a length equal to that of the panel 59 or top wall outer wall member, and said panel 60′ has its ends devoid of any contour formation such as 64. Likewise the panel 61′ has a length equal to the length of the panel 59 and is devoid of any locking corners such as 69 and 70. The said panel or top wall outer wall member 61′ has its ends defined for the full height thereof by score or fold lines 65′ and 66′ through which is integrally hingedly connected therewith tucking flaps 86 and 87. The said tucking flaps 86 and 87 are, as will later be made clear, adapted to be enfolded within the inclined side walls and therefore have their upper edges defined, respectively, by an inclined score or fold line 88 and 89 and through which inclined score or fold lines 88 and 89, the said tucking flaps have integrally hingedly connected therewith reinforcing and spacer flaps 90 and 91. The said reinforcing and spacing flaps 90 and 91 are substantially parallel throughout their length since they are adapted to underlie the substantially parallel side walls top wall members 38.

The top wall outer wall member or panel 59 has integrally hingedly connected therewith through its end score or fold lines 63 an adjacent edge of the bellows corner pieces 43. The remaining panel 62′ of the top wall extension 33′ is provided with adhesive 92 wherefore the lower edge of the top wall inner wall member 61′ is adhesively secured to the bottom panel 25′ instead of having this panel free of said bottom panel as in the blank of FIG. 1.

The bottom wall extension 32′ is, again, in the main, similar to the bottom wall extension 32 of FIG. 1 and is provided with a pair of score or fold lines 72 and 73 thereby providing, in the said extension, panels 74', 75' and 76' respectively forming the bottom wall outer wall member, bottom wall inner wall member and glue flap for the latter. The said panels 74', 75' and 76' are each provided with a similar length, the full width of the bottom or main panel 25', with the said bottom wall outer wall member or panel 74' having its ends defined by score or fold lines 77 and through which tucking flaps 93 are integrally hingedly connected to the ends of said panel 74'.

The panel 75', or bottom wall inner wall member, has its ends in the main, defined by score or fold lines 94 and 95 through which tucking flaps 96 and 97 are integrally hingedly connected therewith, and said tucking flaps 96 and 97, in turn, have respectively connected therewith, through score or fold lines 98 and 99, spacer flaps 100 and 101.

The remaining flap 76' of the end or bottom wall extension 32', as noted above, instead of being merely a spacing flap constitutes a glue flap wherefore it carries on its under-surface, as seen in FIG. 6, adhesive 102.

Since the end or bottom wall is to be folded flat, as will subsequently be made clear, the panel or bottom wall inner wall member 75' is provided with an additional score or fold line 103 and on which the said end or bottom wall is bent or folded to its knocked-down position. The ends of the panel between the score or fold lines 72 and 103 are cut short of the normal ends of the inner and outer wall members to provide on the outer wall member or panel 74' tucking lugs 104 and 105 adapted, in the erected carton, to underlie the bottom ends of the side walls top wall members 38 to provide a finished appearance to said walls and at the same time provide a means with which the tucking flaps 81, at the lower ends of the side walls inner wall members, may cooperate in locking the carton in erected position.

The walls are retained in their upright erected positions through, as noted above, the locking lugs 83 and 84 at the opposite ends of the side walls inner wall members or panels 39' interlocking with suitable locking slits or slots 106 in the top wall inner wall member or panel 61' and similar locking slots or slits 107 in the bottom wall inner member or panel 75'.

The main or bottom panel 25' is provided, downwardly of its end or top wall, with a pair of substantial U-shaped cuts 108 and 109 thereby providing in said main or bottom panel 25' tongues 110 and 111 respectively hingedly connected to the said main or bottom panel 25' through a score or fold line 112 and 113. The tongues 110 and 111 are, respectively, provided with a score or fold line 114 and 115 thereby providing on each tongue a flap 116 and 117 which performs a holding or spacing function as will subsequently be made clear. In addition, the main or bottom panel 25' outwardly of the tongues score or fold lines 112 and 113 is provided with a slit 118 and 119.

Figure 7:
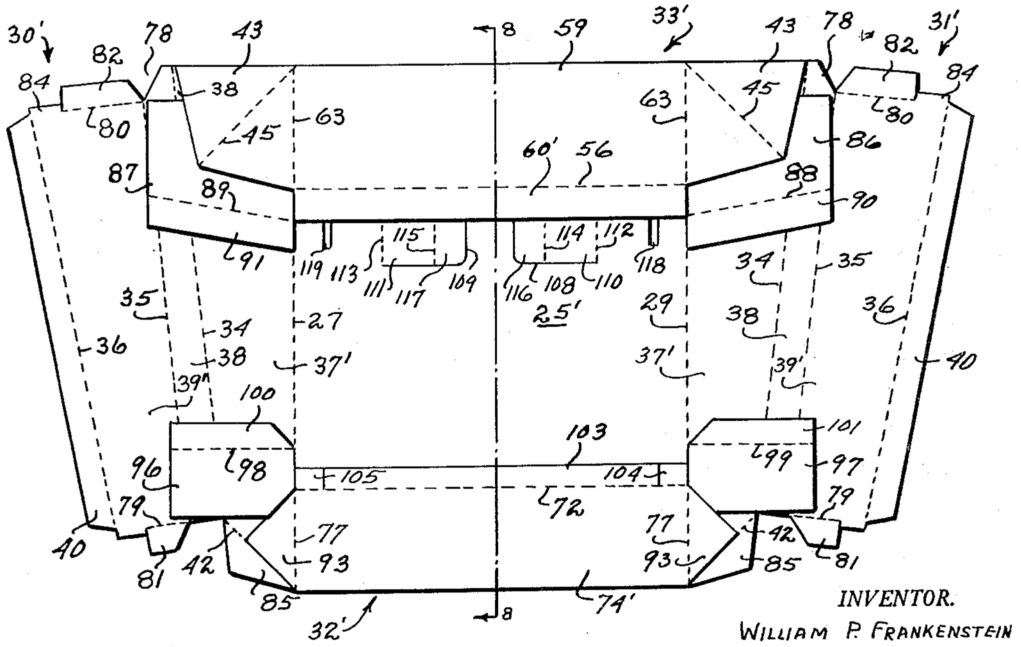
FIG. 7 is a plan view of the blank of FIG. 6 in its final folded or knocked-down position as shipped to the user.
Figure 8:
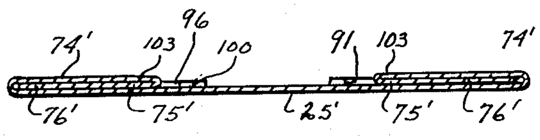
FIG. 8 is a transverse sectional view through the knocked-down blank of FIG. 7 as seen from line 8—8 on said FIG. 7.

After the blank has been cut and scored, as above set forth, and the adhesive 92 applied to the under-surface of the flap 62' and similar adhesive 102 applied to the under surface of the glue flap 76', the top wall extension 33' is folded on its score or fold line 57 to superimpose panels 61' and 62' on the panels 60' and 59 as illustrated in phantom lines at 120 in FIG. 6. Likewise the bottom wall extension 32' is folded on the supplementary score or fold line 103 for superimposing the outer portion of the panel 75' and the panel 76' on the remaining or inner portion of the panel 75' and the panel 74', all as illustrated in phantom lines at 121 in FIG. 6. This folding of the said top and bottom wall extensions exposes the adhesive on the glue flaps 62' and 76'. The said extensions are then further folded on the main or bottom and score or fold lines 28 and 26 for superimposing the panels on the said main or bottom panel 25' and adhesively securing the said extension to the main or bottom panel as illustrated in FIGS. 7 and 8. It is in this condition that the modified knocked-down blank is shipped to the user.

Figure 14:
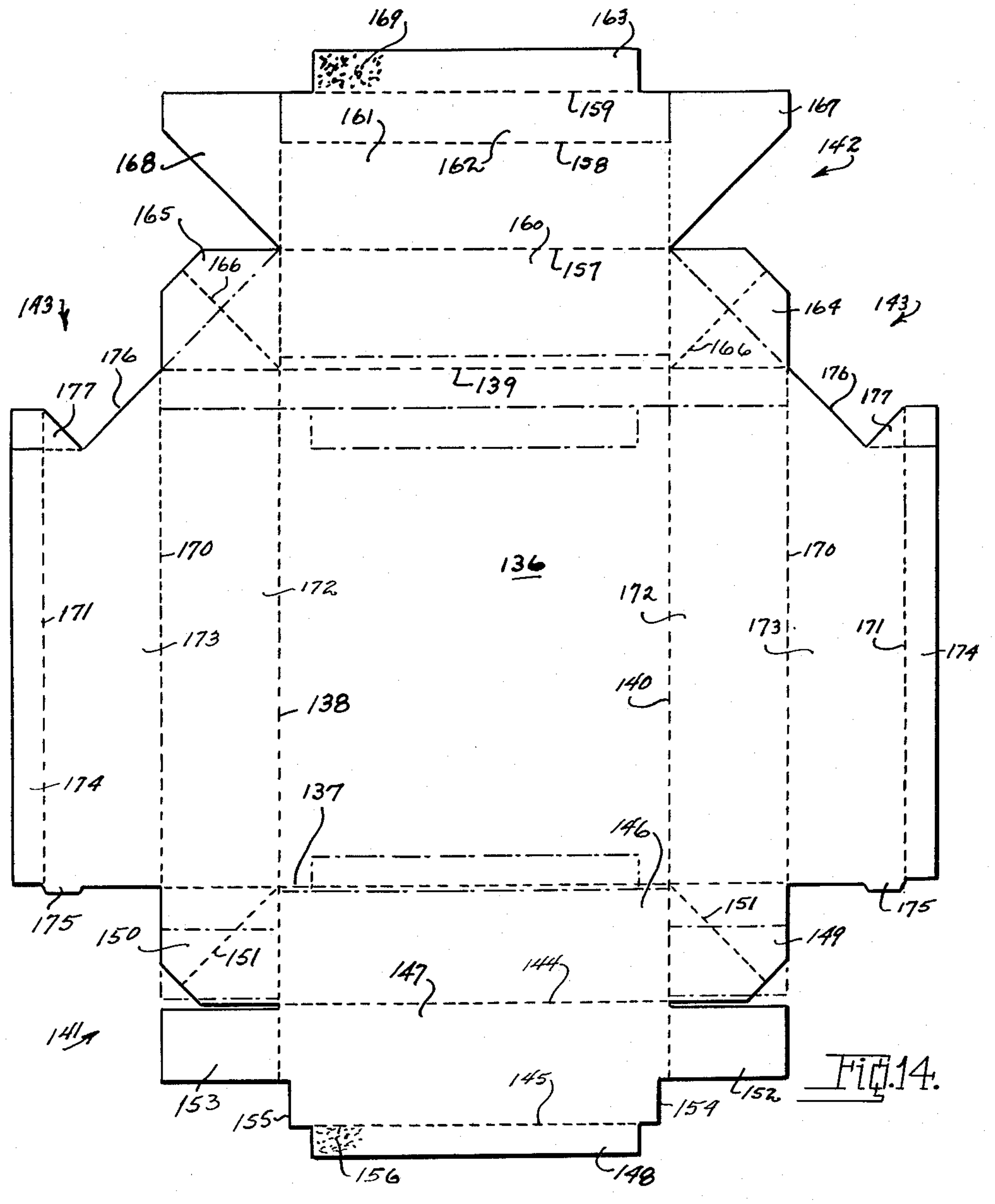
FIG. 14 is an extended view of a blank disclosing modification over the blank of FIG. 9 and particularly disclosing a blank for providing a lid or cover for use with the box or carton of FIG. 9.

It will be noted that the modified blank of FIGS. 6, 7 and 8 have the top and bottom walls inner wall members adhesively secured to the main or bottom panel 25' instead of having the side walls extensions so secured as in the blank of FIG. 1. The reason for the foregoing is the fact that the side walls in the modified blank or carton incline from the top to the bottom thereof and cannot be conveniently knocked down. The reason for supplying the supplemental fold or score line 72 is because the panel cannot be folded flat on normal score or fold line, as was the case in the blank of FIG. 1, because of the particular size illustrated, a similar construction of a different size is illustrated in FIGS. 14 and 15 which does permit folding on normal lines.

The modified box or carton is erected from the knocked-down blank of FIG. 7, in the same manner that the erected carton of FIG. 3 was erected from the knocked-down blank of FIG. 1. This erection consists in raising the knocked-down top and bottom walls from their flattened positions to have, insofar as the top wall is concerned, the inner and outer wall members thereof normal to the base or bottom panel and, insofar as the bottom wall is concerned, the inner wall will be normal to said bottom or main panel. With the said top and bottom walls upstanding from the bottom panel the tucking flaps 86, 87, 96 and 97 are arranged to extend transversely of the main or bottom panel as illustrated in FIG. 9, whereupon the side walls extensions are raised to extend normal to the main or bottom panel, and the several panels of the said side walls extensions are arranged to be normal to one another and such arrangement to be interiorly of the boxes or cartons for enclosing the end wall, top and bottom walls, tucking flaps and thereby locking the parts in their erected carton forming positions.

As was noted above, the modified box or carton is desired for display purposes as well as shipping and for these reasons there is provided an elevating and display device to cooperate with the box or carton.

Figures 12, 13, 15:
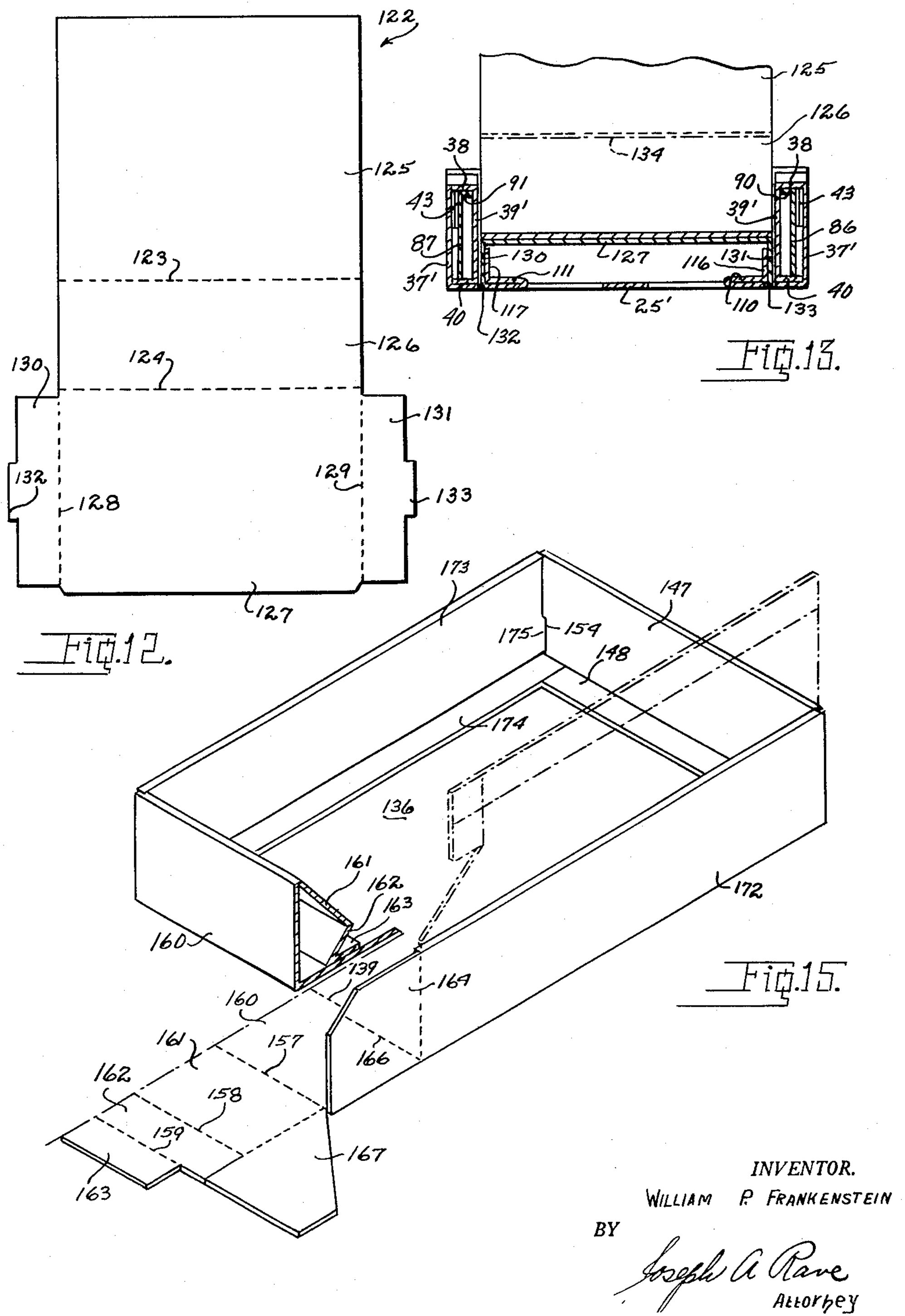
FIG. 12 is an extended plan view of a blank useful with the carton or the carton of the present invention in accomplishing certain functions or objects thereof and which blank is illustrated in phantom lines in FIG. 9 and in solid lines in FIGS. 10 and 11 in conjunction with the carton disclosed in said FIGS. 10 and 11.
FIG. 13 is a sectional view similar to FIG. 11 but disclosing the parts in an adjusted position from that in FIG. 11.
FIG. 15 is a perspective view of a partially erected cover from the blank of FIG. 14 and in which certain parts are shown as torn away to more clearly illustrate the construction.

The elevating and display device may take the form of a rectangular blank such as depicted in FIG. 12 and is substantially rectangular in plan and indicated by the reference numeral 122. The blank 122 is provided with a pair of traverse score or fold lines 123 and 124, thereby forming in said blank, panels 125, 126 and 127. The panel 127, which may be termed an elevating panel, has integrally hingedly connected therewith through score or fold lines 128 and 129, elevating or raising flaps 130 and 131. Each of the flaps 130 and 131 has outwardly projecting from substantially its midpoint a locking lug 132 and 133.

Figure 9:
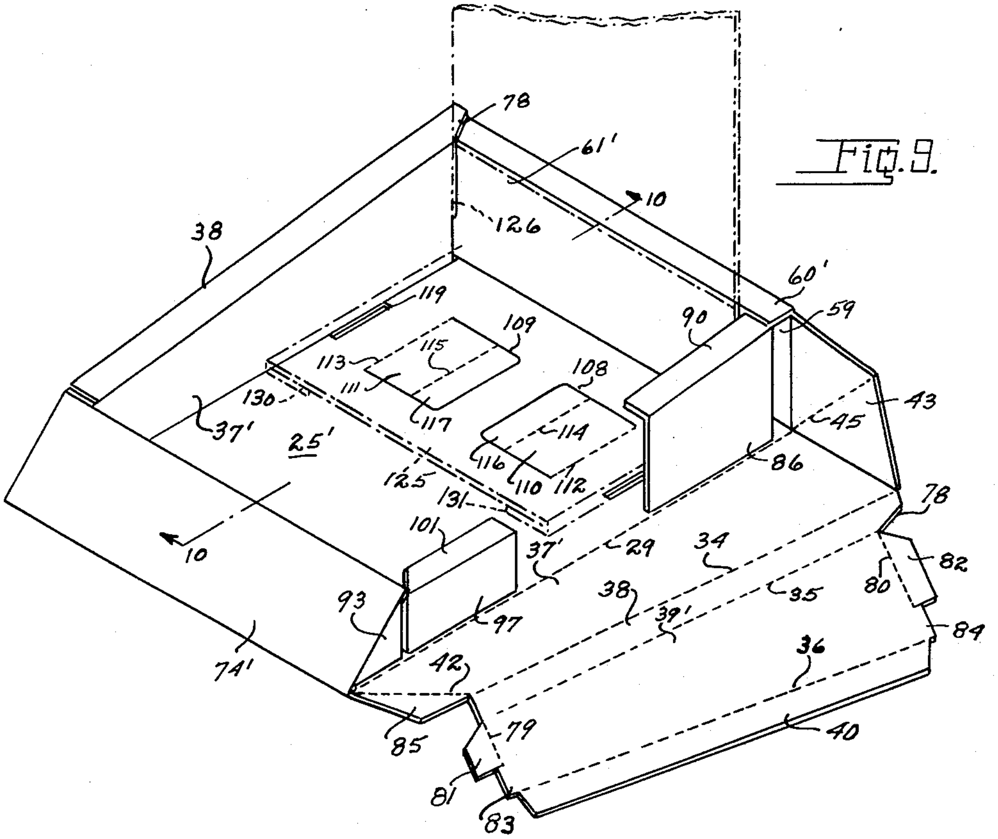
FIG. 9 is a perspective view of a partially erected carton from the knocked-down blank of FIGS. 7 and 8.
Figure 10:
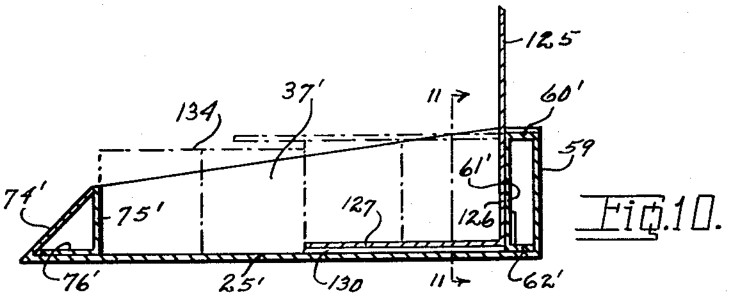
FIG. 10 is a longitudinal sectional view through the erected carton of FIG. 9 as seen from line 10—10 on said FIG. 9.
Figure 11:
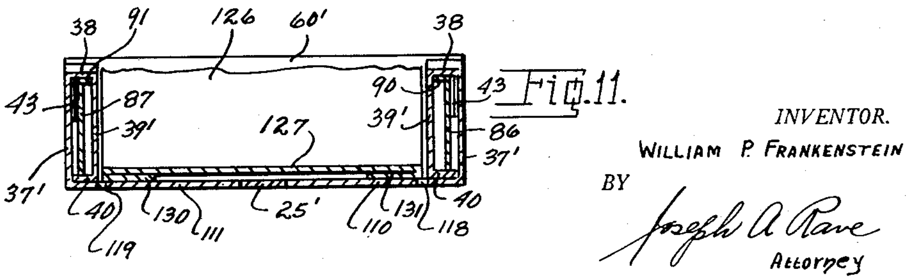
FIG. 11 is a transverse sectional view through the erected carton of FIG. 9 as seen more particularly from line 11—11 on FIG. 10.

In practice, the said blank 122 has the elevating or raising flaps 130 and 131 folded to underlie the elevating panel 127 whereupon the said elevating and display device is placed in the erected box or carton of FIG. 9 with said panel 127, with its underfolded flaps 130 and 131, is placed over the carton's bottom tongues 110 and 111, as illustrated in phantom lines in FIG. 9, and in solid lines in FIGS. 10 and 11. The panels 125 and 126 are arranged to upstand from the bottom panel of the box or carton with the panel 126 against the carton back wall inner wall member 59, as illustrated in FIG. 10, and with the panel 126 upward of the box or carton for advertising and display purposes.

The goods, illustrated in FIG. 10 in phantom lines at 134, is then placed within the said carton and on the elevating panel 127 and on the carton main or bottom panel 25'. The advertising panel 125 of the insert is then folded down on top of the goods 134, again as shown in phantom lines in said FIG. 10. The carton with its contained goods and the elevating and display device in position are then covered by a lid or cover indicated in its entirety by the reference numeral 135 in FIG. 16. It is in this condition that the package is delivered to the purchaser.

The lid 135 is illustrated in FIGS 14 and 15 and while it is primarily a lid or cover, its construction simulates the construction of a box or carton and as such constitutes or forms a part of the present invention and will now be defined in detail.

The blank as illustrated in FIG. 14 comprises a main or covering panel 136 bounded by score or fold lines 137, 138, 139 and 140, with the said score or fold lines 137 and 139 each integrally hingedly connecting with the said main or covering panel 136 an extension 141 and 142 respectively forming the top and bottom of the said cover or lid. The score or fold lines 138 and 140 respectively, integrally, hingedly connect with the covering panel 136, a similar extension 143 which forms the side walls of the said lid or cover.

The extension 141 is provided with a pair of score lines 144 and 145 which extend longitudinally thereof to form in the erected lid or cover panels 146, 147 and 148, which respectively form the top wall outer wall member, the top wall inner wall member and a creeper or locking flap 148. The panel or top wall outer wall member 146 has integrally hingedly connected to its ends bellows corner pieces 149 and 150, each of which is provided with a diagonal score or fold line 151. The panel or top wall inner wall member 147 has integrally hingedly connected to it, for a portion of each of its opposite ends, a tucking flap 152 and 153. The said panel or top wall inner wall member 147 is provided outwardly of the tucking flaps 152 and 153 with cutback portions providing locking shoulders 154 and 155 which cooperate with the side walls in locking the lid or cover in its erected condition, as will subsequently be made clear.

The remaining panel of the top wall extension is provided with adhesive 156 for securing the parts in operative position to the covering panel 136.

The bottom wall extension 142 is provided longitudinally thereof with a plurality of score or fold lines 157, 158 and 159, thereby dividing said extension into panels 160, 161, 162 and 163.

In the erected lid or cover the panel 160 forms the bottom wall outer wall member and has integrally, hingedly, connected with its opposite ends bellows corner pieces 164 and 165, which are similar to the bellows corner pieces of the top wall, and respectively provided with a diagonal score or fold line 166. In the erected lid or cover the panel 161 forms in the bottom wall thereof an inclined shoulder for engagement with the carton inclined bottom wall outer wall member and said panel 161 has integrally, hingedly, connected to its ends substantially triangular-shaped tucking flaps 167 and 168 which cooperate with the side walls for effecting and supporting the inclined shoulder 161. The panel 162 forms an inner wall member for the bottom wall, and is inclined with respect to the outer wall member or panel 160 as well as oppositely inclined with respect to the bottom wall outer wall member 161, for anchoring the said shoulder panel 161 in operative position and at the same time forms an angularly disposed strut at the bottom end of the cover. The remaining panel 163 of the extension 142 forms or constitutes a glue flap and carries adhesive 169 through which the bottom wall panels are secured in position.

The side wall extensions 143 being substantially duplicates of one another, it is deemed sufficient if but one of them be described in detail. Wherefore the said extension 143 is provided with a pair of score or fold lines 170 and 171 which extend longitudinally thereof and provide in the said extension, panels 172, 173 and 174. The panel 172 is rectangular in area and has integrally hingedly connected to its opposite ends the top wall bellows corner piece, respectively, 149 or 150 and has integrally connected to its other end, respectively, a bellows corner piece of the bottom wall, 164 or 165. The panel 173, of the side wall extension, has its one end cut in line with the covering panel score 137, wherefor the said cut end is at right angles to its sides are defined by the score or fold lines 170 and 171, with said panel 173 having projecting outwardly of said cut end a locking lug 175 which, as will subsequently be made clear, enters and engages with the top wall inner wall member locking shoulders 154 and 155. The side wall extension panel 173 has its other end upwardly inclined or biased as at 176 and the angle of which inclination corresponds with the angle of inclination of the top wall upwardly extending shoulder 161 upon erection of the said cover or lid. Outwardly of the biased portion 176, the panel 173 has integrally hingedly connected therewith a triangular shaped lug 177 forming an interlocking lug for underlying the bottom wall strut or brace 162.

The remaining panel 174 of the side wall extension 143 is a creeper and adapted to overlie the covering panel 136 behind the top and bottom walls glue flaps or panels 148 and 163.

Figure 16:
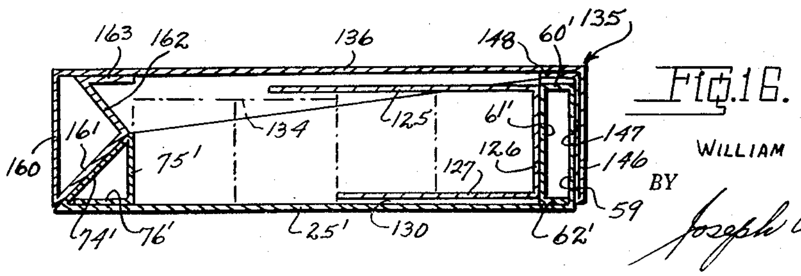
FIG. 16 is a longitudinal sectional view of a complete package and particularly including the set-up box or carton of FIG. 6 with the auxiliary blank of FIG. 12 mounted therein and the package complete or covered by the cover of the blank of FIG. 14.

Upon the erection of the lid or cover from the knocked-down blank of FIG. 14 to that as shown in FIG. 15 the said lid or cover may be placed over the carton of FIG. 9 together with its contents as clearly illustrated in FIG. 16. As will be noted from said FIG. 16, the inwardly inclined shoulder 161 rests on the inwardly inclined shoulder or front wall member 74′ with the top wall of the lid or cover externally of the top wall of the box or carton. The parts are so designed and cooperate with one another in such a manner that the upper surface of the lid covering panel is parallel with the outer surface of the carton main or bottom panel, again as clearly illustrated in FIG. 16. This construction results in a shipping package that may be readily packed in a shipping case or carton and a construction whereby the filled packages may be readily stacked in a storeroom or on a shelf.

The seller may readily remove the cover from the package and by merely raising the covering or advertising panel 125 of the elevating or display device 122 may advantageously display the goods of the package. At the same time, and as desired, a more spectacular display may be affected by raising the upper end of the goods, or in case the said goods are in reality relatively small articles, may raise the goods at the upper end of the box above those at the lower end of the box and, of course, thereby raise said goods above the side walls of the box.

In order to accomplish this the user pushes inwardly on the tongues 110 and 111 in the box or carton bottom panel 25′ by exerting pressure against the panels of said tongues that are located, respectively, between the score or fold lines 112 and 114, for the tongue 110, and the score or fold lines 113 and 115, for the tongue 111. This pressure causes the panels 116 and 117 respectively to be deflected on its score or fold line 114 and 115 during the movement of the tongue. The said movement of the tongues 110 and 111 immediately raises the elevating or supporting panel 127 of the device 122 and at the same time raises the goods reposing thereon. The movement of the tongues 110 and 111 also engages, particularly after the insert has been elevated or raised to the upper limit of the tongue's movement, with the elevating panel flaps 130 and 131 for downwardly actuating same from the positions thereof illustrated in FIG. 11. Continued movement of the tongues 110 and 111 beyond a 90 degree arch outwardly pushes the said elevating panel flaps 130 and 131 until they depend at right angles to the said elevating or supporting panel 127 and at this time the panels 116 and 117 of the tongues 110 and 111 are in face contact with said flaps and are vertically disposed with respect to the carton main or bottom panel. At the same time, also, the locking lugs 132 and 133 of the flaps 130 and 131 are snapped into the apertures 118 and 119 in the carton main or bottom panel 25′. This locks the elevating or supporting panel 127 in operative position upwardly of the main or bottom panel of the carton a distance determined by the height of the flaps 130 and 131, as well as by the height of the tongues panels 116 and 117, all as clearly illustrated in FIG. 13.

From the foregoing, it will be noted that the carton of FIG. 9 may have the goods therein displayed thereabove for attractive sales.

From the foregoing it will be noted that there has been provided a box or carton in which the walls that are exposed to view are contoured or inclined for adding to the appearance thereof and for effecting an attractive package for display and sales but this contour has been confined to a single wall of the carton.

In the modification disclosed in FIGS. 17 to 20, inclusive, the walls of the box or carton are contoured in opposite directions, that is, from a point or line longitudinally of each wall. Yet the carton may be set up from a semi-assembled or knocked-down blank.

Figure 17:
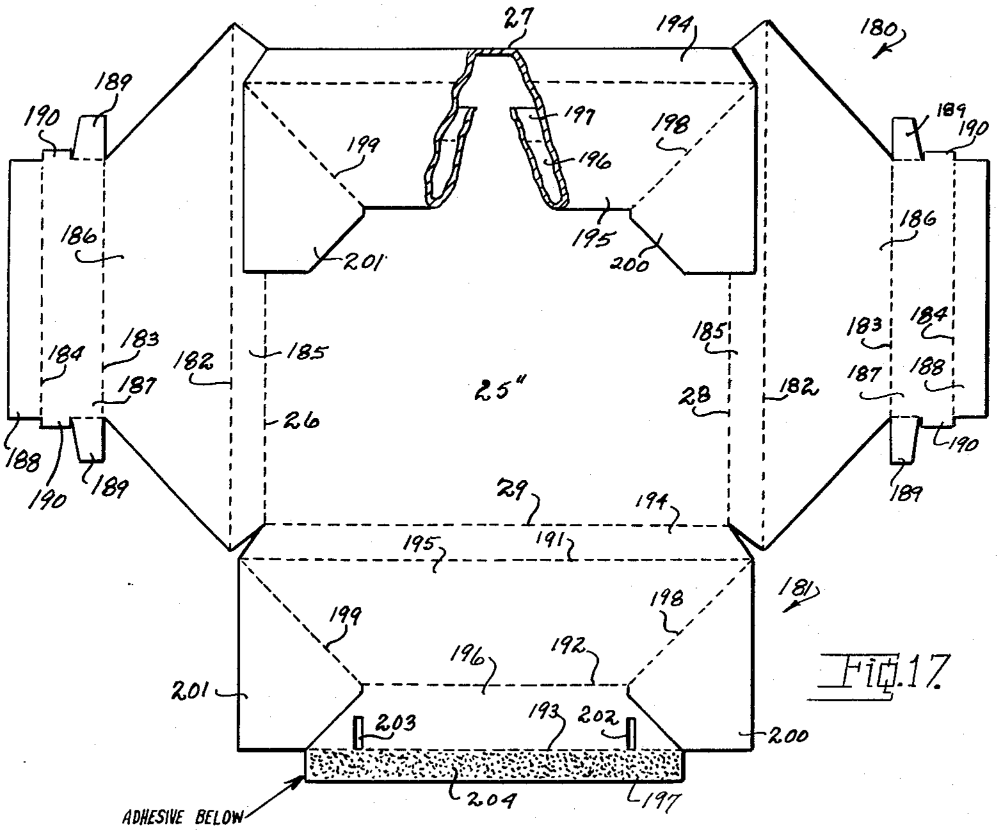
FIG. 17 is an extended plan view of a modified blank for producing a box or carton wherein each of the walls is provided with a contoured cross-section of a modified form over that produced with the blanks of FIGS. 1 and 6.

The blank as illustrated in FIG. 17 comprises a main or bottom panel 25'' having its edges defined by score or fold lines 26, 27, 28 and 29. The score or fold lines 26 and 28 respectively integrally hingedly connect with the bottom panel 25'' a similar extension 180, which in the erected carton form the end walls, while the score or fold lines and 27 and 29 respectively integrally hingedly connect with the bottom panel similar extensions 181, which in the erected carton formed the side walls. It should be noted that in this regard the terms of end and side walls may be interchanged, the former generally referring to the shorter dimension of a box or carton while the latter term generally refers to the longer dimension of the said box or carton.

As illustrated in FIG. 17 the extensions 180 are each provided with a plurality of score or fold lines 182, 183 and 184, thereby forming in each extension panels 185, 186, 187 and 188. The ends of the panels 185 and 186 in each extension diverge from one another from the ends of their defining or common score or fold lines 182 and it will be noted that the panel 186 in each extension is considerably wider than the panel 185. These panels, 185 and 186, may be regarded as the outer wall member and top wall member of the end wall or may be regarded together as forming the end wall outer wall member and having a transverse contour or an inclination in opposite directions. The degree of inclination and amount of top wall proper is determined by the position of the score or fold line 182 toward and from the bottom panel bounding score or fold line 26 or 28. In other words by changing the relative proportions of width of panels 185 and 186 the degree of inclination of said panels with respect to one another is correspondingly changed.

The panel 187 of each extension 180 constitutes or forms the inner wall member of its side wall and in the main has its ends normal to its length since it is disposed vertically of the carton main or bottom panel and between the side walls inner wall members as will presently be made clear. The said panels 187 each has integrally hingedly connected with each of its opposite ends a tucking flap 189 and each has at its outer corners locking lugs 190. The remaining panel 188 of each of the extensions 180 is a creeper flap and is disposed on the upper surface of the main or bottom panel 25''.

The side wall extensions 181 again being substantially identical it is deemed sufficient if but one of them be described in detail and comprises score or fold lines 191, 192, 193 forming in said extension panels 194, 195, 196, and 197. The panels 194 and 195, similar to the panels 185 and 186 of the extension 180 have their ends diverging from points at the opposite ends of the separating score or fold line 191. Again panels 194 and 195, similar to the panels 185 and 196, are of dissimilar width and are respectively of substantially the same width as the said panels 185 and 186. The ends of the panels 194 and 195 incline to substantially the same degree as the said panels 185 and 186 so that the side walls and end walls are systematical and contiguous at their joining edges. The panel 195, instead of having its ends defined by inclined cut lines, has its ends defined by score or fold lines 198 and 199 for integrally, hingedly, connecting therewith tucking flaps 200 and 201.

The relative width of the panels 194 and 195 with respect to one another may be varied, as pointed out above in connection with panels 185 and 186 and for the same reason. It will of course be understood that the proportions of the panels in both the end wall extensions and the side wall extensions will be equal in order to obtain a similarly contoured wall for the ends and sides of the carton.

The panel 196 of the side wall extension 181 constitutes or forms, in the erected carton, the side wall inner wall member and has its ends flaring so as to give added length to its outer end to be beyond the end walls inner wall members and to cooperate therewith in locking the walls in erected positions. For this purpose the said panel 196 is provided inwardly of its outer ends with slits 202 and 203 which receive the locking lugs 190 of the end walls inner wall members or panels 97. The remaining panel 197 is a glued flap and has adhesive 204 applied to the under surface thereof as seen in FIG. 17.

The blank of FIG. 17, after being cut and scored as above described and having the adhesive 204 applied to the glue flap of each side wall extension, has the said extensions first folded on their respective scored or folded outlines 192 thereby exposing the adhesive 204 whereupon the extensions are inwardly folded, respectively, on the score or fold lines 27 and 29 to bring the glue flaps 197 into engagement with the carton main or bottom panel 25'', which is the position occupied by the extension 181 at the upper end of FIG. 17. The said blank is now completely knocked down as illustrated in FIG. 18 and it is in this condition that the blank is shipped to the user.

Figure 2:
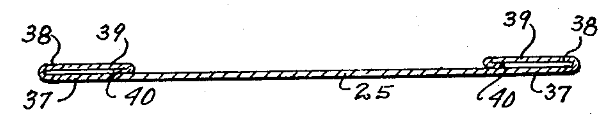
FIG. 2 is a transverse sectional view of the blank of FIG. 1 in its knocked-down condition.
Figure 4:
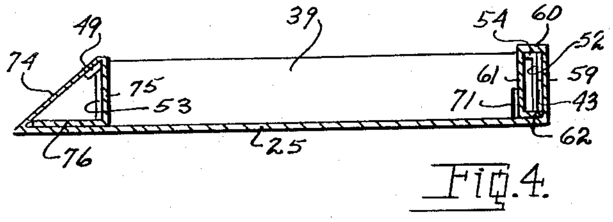
FIG. 4 is a longitudinal sectional view of the set-up carton of FIG. 3 as seen from line 4—4 on said FIG. 3.
Figure 5:
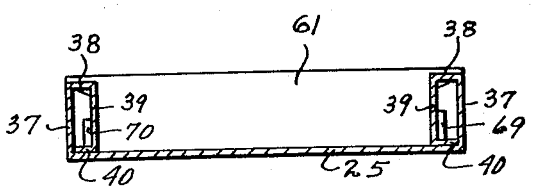
FIG. 5 is a transverse sectional view of the set-up carton as seen from line 5—5 on said FIG. 3.
Figures 18, 19, 20:
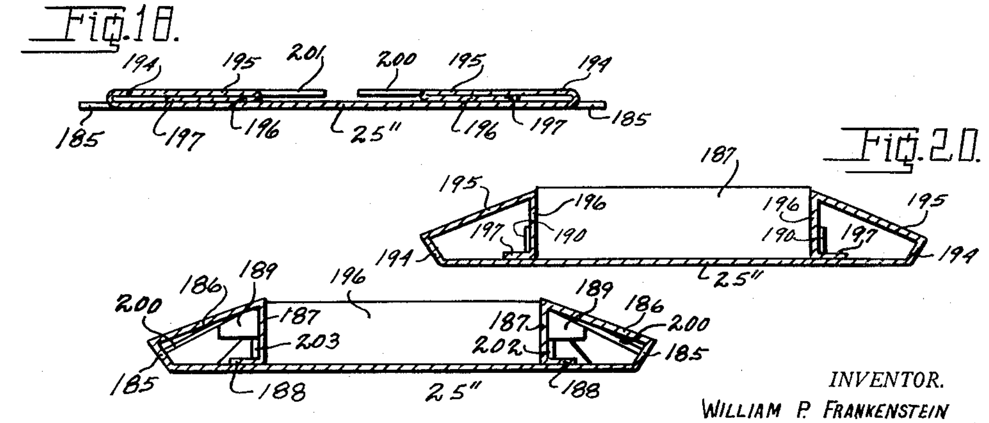
FIG. 18 is a transverse sectional view of the knocked-down blank of FIG. 17.
FIG. 19 is a longitudinal sectional view of a set-up box or carton from the blank FIGS. 17 and 18.
FIG. 20 is a transverse sectional view taken at right angles to FIG. 19 and illustrating the set-up box or carton from the blank of FIG. 17.

The user upon desiring to set up the box or carton follows the same steps as above outlined in connection with the knocked down blank of FIG. 2, with the result of a box or carton having the side and end walls thereof contoured as illustrated in FIGS. 19 and 20.

Figure 21:
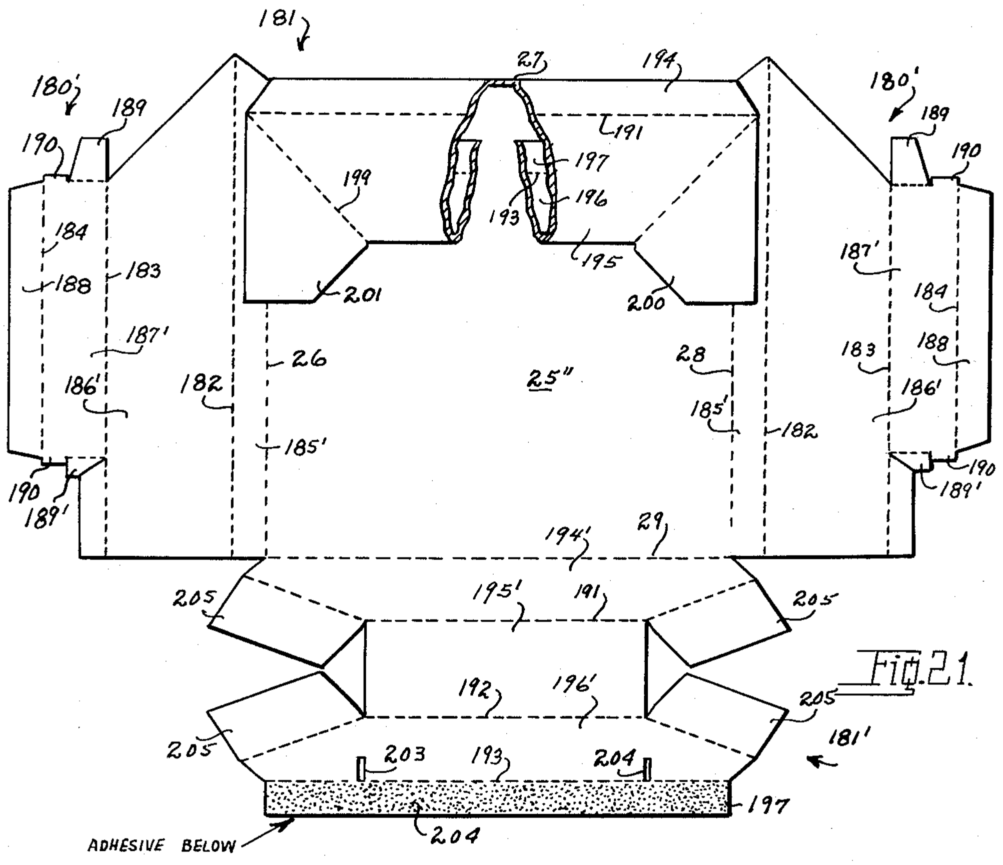
FIG. 21 is an extended plan view of a blank disclosing modifications over that of FIG. 17 and in which the walls of the erected carton have different cross sections.
Figure 22:
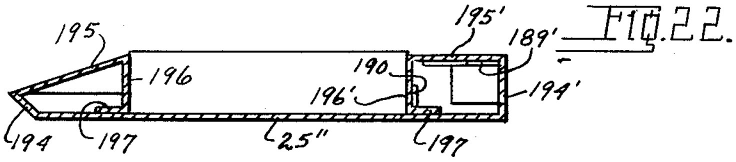
FIG. 22 is a longitudinal sectional view through an erected carton set-up from the blank of FIG. 21.
Figure 23:
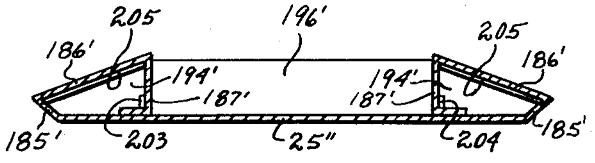
FIG. 23 is a transverse sectional view through an erected carton from the blank of FIG. 21 and taken at right angles to FIG. 22.

The modification illustrated in FIGS. 21, 22 and 23 is quite similar to that illustrated in FIGS. 17–20, except that only three of the walls are provided with a contoured or inclined outer wall member while the fourth wall is substantially rectangular in cross section. The blank of FIG. 21 is modified over the blank of FIG. 17 to the extent of eliminating, in each end wall extension 180', from one of the ends of panels 185 and 186 the contour or inclination thereof and making the same as a straight line in alignment with one of the main or bottom panel side score or fold lines, side score or fold line 29, for example.

The said blank in FIG. 21 is further modified in that one of the side wall extensions, side wall extension 181', for example, is provided with the panels 194' and 196' of similar height and contour while the panel 195' has its ends normal to its defining score or fold lines 191 and 192. Each of the panels 194' and 196' carries at its inclining ends tucking flap 205.

The blank of FIG. 21 has its side wall extensions secured through the glue flaps 197 for providing the knocked-down blank as shipped to the user. The user desiring to set up or erect the box or carton does so by raising the folded side wall extensions to their normal positions whereupon the end walls are folded as above set forth for completing the erection of the carton.

The erected carton from the blank of FIG. 21 has two opposed walls, end walls for example, with its outer wall member contoured, as in FIG. 23, while the remaining two opposed walls, side walls for example, each have a different cross-section, one having a contoured outer wall member as the end walls and the other having a rectangular cross-section, all as illustrated in FIG. 22.

Figures 24, 25, 26, 27:
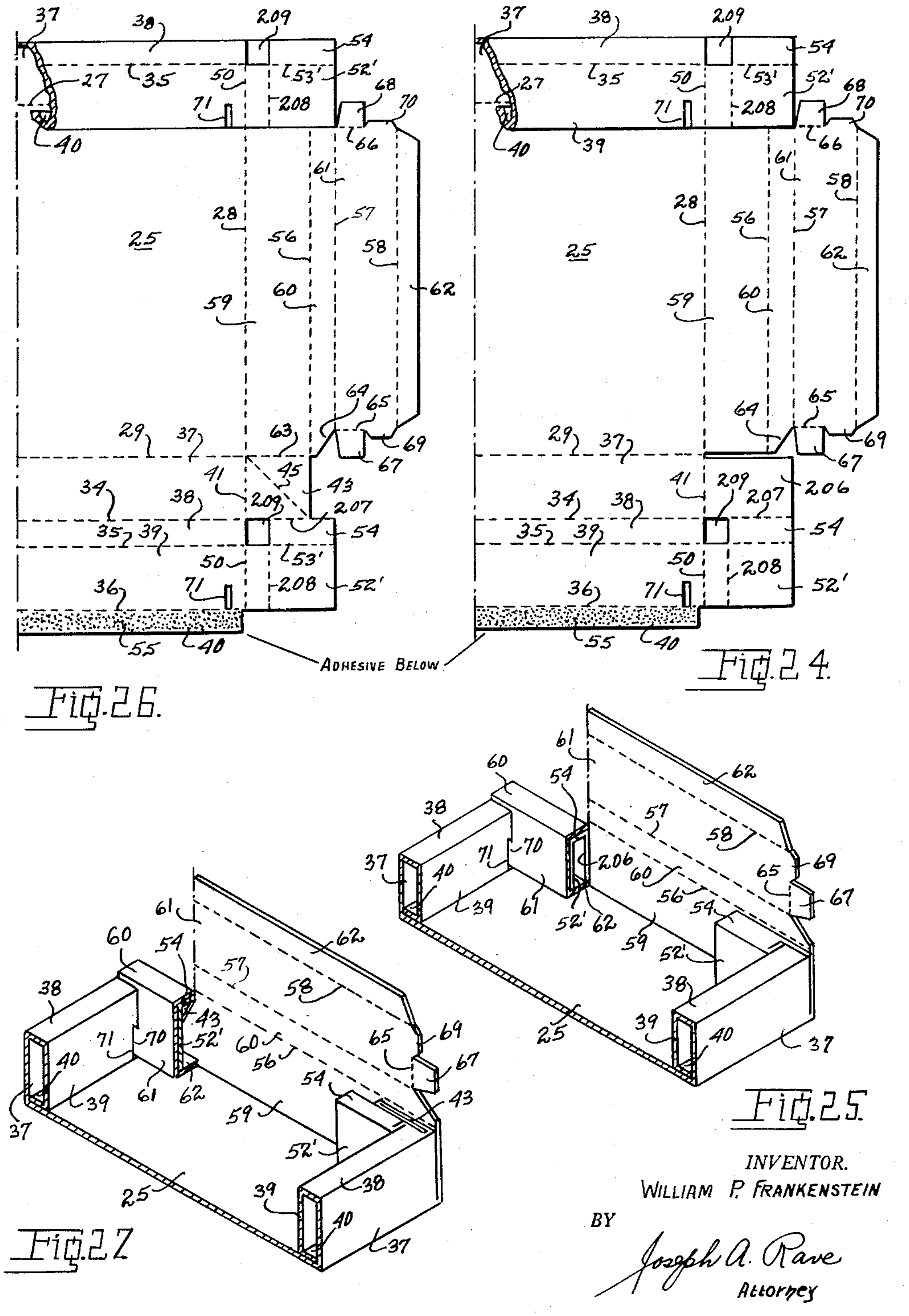
FIG. 24 is a plan view of a part blank showing modification therein over the blank of FIG. 1.
FIG. 25 is a perspective view of a partially erected part of a carton from the part blank of FIG. 24 with parts torn away to show the construction.
FIG. 26 is a plan view of a part blank showing additional modifications therein over those disclosed in FIG. 24 on the blank of FIG. 1.
FIG. 27 is a perspective view, similar to FIG. 25, of a partially erected part of a carton from the part blank of FIG. 26 and, again, with parts torn away to show the construction.

The modification disclosed in FIGS. 24 and 25 is based on the disclosure in FIG. 1 and discloses a mechanism whereby the corners of the carton are additionally reenforced through the use of a tucking flap 206 which is connected with the spacing flap 65 through a score or fold line 207. In addition, the tucking flap 52' is provided with a vertical score or fold line 208 which is in alignment with the outer edge of an aperture 209 formed in the spacer flap 54.

By this construction, the tucking flap is in effect a rectangular or box-like support for the corners of the box or carton as clearly illustrated in FIG. 25. It will be noted from the upper corner of said FIG. 25 that the tucking flap portion 52' is immediately adjacent the inner wall member 61, that the tucking flap 206 is immediately adjacent the outer wall member 59 and with the spacer flap 54 immediately beneath the top wall member 60. The said spacer flap aperture 209 permits the proper folding and positioning of the said rectangular or box like spacer flap.

The modification illustrated in FIGS. 26 and 27 accomplishes substantially the same reenforcement of the carton corners, but instead of a fully depending tucking flap 206, utilizes a bellows corner flap 43' which is connected with the spacer flap 54 through the score or fold line 207 at the inner edge of said spacer flap 54.

It will be obvious from with the construction illustrated in FIG. 26 that upon the raising of the top wall extension from its flat position, in FIG. 26, to its upstanding position in FIG. 27, will automatically inwardly position the corner tucking flap assembly as clearly illustrated in FIG. 27.

From the foregoing, it will be noted that there has been provided a box or carton which may be utilized as a shipping carton as well as a display box for goods and that the several modifications herein disclosed and described accomplishes the objectives initially set forth.

What is claimed is:

A carton of the class described comprising a bottom, a side wall from each of two opposite edges of said bottom each including an inner and an outer wall member, said side walls having greater height at one end than at the other, wherefore the upper edges of said side walls incline in the direction of their length, a rear end wall from one of the remaining edges of the bottom and having a height substantially equal to the height of the side walls greater height ends, a front end wall from the remaining edge of the bottom and including an inner and an outer wall member with the inner wall member normal to the bottom and the outer wall member inclining toward the bottom, cooperating means on said wall members for locking the walls in their operative upstanding erected positions, a separate and independent member within said carton disposed on the carton bottom and of a width equal to the distance between the side walls and of a length to extend from the rear end wall toward the front end wall but stopping short of said front end wall and with said separate and independent member underlying goods within the carton, said carton bottom beneath the said separate and independent member having formed therein a pair of U-shaped cuts each with its arms joined by a hinge line respectively adjacent an opposite side wall whereby tongues are provided extending toward one another but with their free ends spaced from one another so that said tongues may be actuated inwardly of the carton for raising said separate and independent member and the goods disposed thereon, a supporting flap hingedly connected with and depending from each end of said separate and independent member for retaining the said separate and independent member and goods thereon in the raised position, a locking lug at the free end of each locking flap, and a locking slit for the flap locking lug in the bottom cooperating with one another for locking the separate and independent member in a raised position.

References Cited in the file of this patent

UNITED STATES PATENTS

| | | |
|---|---|---|
| 196,358 | Heath | Oct. 23, 1877 |
| 1,844,066 | Hughes | Feb. 9, 1932 |
| 1,916,119 | Schwartz et al. | June 27, 1933 |
| 2,090,200 | Hekman | Aug. 17, 1937 |
| 2,276,890 | Steinbiss | Mar. 17, 1942 |
| 2,307,146 | McCash et al. | Jan. 5, 1943 |
| 2,397,135 | Frankenstein | Mar. 26, 1946 |
| 2,519,831 | Frankenstein | Aug. 22, 1950 |
| 2,522,049 | Lang | Sept. 12, 1950 |
| 2,534,402 | Blair | Dec. 19, 1950 |
| 2,670,126 | Frankenstein | Feb. 23, 1954 |
| 2,745,543 | Broderick | May 15, 1956 |